(12) United States Patent
Martin (10) Patent No.: US 7,669,821 B2
(45) Date of Patent: Mar. 2, 2010

(54) RETRACTABLE ACCESSORY HOOK FOR A VEHICLE

(75) Inventor: Amy L. Martin, Bellefontaine, OH (US)

(73) Assignee: Honda Motor Co., Ltd, Tokyo (JP)

( * ) Notice: Subject to any disclaimer, the term of this patent is extended or adjusted under 35 U.S.C. 154(b) by 122 days.

(21) Appl. No.: 11/866,166

(22) Filed: Oct. 2, 2007

(65) Prior Publication Data

US 2009/0084922 A1 Apr. 2, 2009

(51) Int. Cl.
*E04G 3/00* (2006.01)
(52) U.S. Cl. .............. 248/294.1; 248/304; 248/305; 248/306; 248/308; 248/322; 248/339; 248/291.1; 248/292.13; 248/292.14; 224/553; 224/313; 224/583; 24/305; 24/308
(58) Field of Classification Search .......... 248/304, 248/305, 306, 308, 322, 339, 291.1, 292.13, 248/292.14, 294.1; 224/553, 313, 583; 24/305, 24/308

See application file for complete search history.

(56) References Cited

U.S. PATENT DOCUMENTS

| | | | |
|---|---|---|---|
| 462,723 A | 11/1891 | Morss | |
| 2,390,257 A * | 12/1945 | Jahn | 248/294.1 |
| 3,385,547 A | 5/1968 | West | |
| 4,221,354 A * | 9/1980 | Kempkers | 248/291.1 |
| 4,517,709 A | 5/1985 | Arentsen et al. | |
| 4,711,488 A | 12/1987 | Ohanessian | |
| 4,720,028 A * | 1/1988 | Takemura et al. | 224/553 |
| 4,763,820 A | 8/1988 | Gardner, Jr. | |
| 5,383,588 A | 1/1995 | Kazel | |
| 5,415,457 A | 5/1995 | Kifer | |
| 5,492,260 A | 2/1996 | Rieden et al. | |
| 5,507,423 A | 4/1996 | Fischer et al. | |
| 5,769,294 A | 6/1998 | Heinz et al. | |
| 5,836,646 A | 11/1998 | Salehi et al. | |
| 5,863,092 A | 1/1999 | Kifer | |
| 5,975,594 A | 11/1999 | Sandhu et al. | |
| 6,095,469 A * | 8/2000 | Von Alman | 248/304 |
| 6,109,579 A | 8/2000 | Huang | |
| 6,131,993 A | 10/2000 | Pesta et al. | |
| 6,422,524 B1 | 7/2002 | Spagnuolo et al. | |
| 6,443,523 B1 | 9/2002 | Reitze | |
| 6,457,690 B1 | 10/2002 | Spykerman et al. | |
| 6,663,067 B2 * | 12/2003 | Gordon | 248/294.1 |
| 6,692,067 B2 | 2/2004 | Inari et al. | |

(Continued)

*Primary Examiner*—J. Allen Shriver, II
*Assistant Examiner*—Nkeisha J Smith
(74) *Attorney, Agent, or Firm*—Mark Duall; Michael A. Forhan; Eley Law Firm Co.

(57) ABSTRACT

A retractable accessory hook assembly for a vehicle. A housing has a cavity with an opening. A hook is pivotably coupled to the housing and is movable between a stowed position substantially within the cavity and a deployed position at least partially extending from the opening of the cavity. A cover is also pivotably coupled to the housing and is configured to selectably close off at least a portion of the opening of the cavity. The cover is movable from a closed position proximate the housing to an open position away from the housing while the hook is being moved to a stowed or deployed position. The cover is also movable from the open position to the closed position to retain the hook in either the stowed or deployed positions.

19 Claims, 11 Drawing Sheets

U.S. PATENT DOCUMENTS

| | | |
|---|---|---|
| 6,793,107 B2 | 9/2004 | Karner |
| 6,935,601 B2 * | 8/2005 | Tanaka .................... 248/294.1 |
| 6,959,954 B2 * | 11/2005 | Brandt et al. .............. 296/1.08 |
| 6,968,601 B2 | 11/2005 | Bivens et al. |
| 6,991,204 B2 | 1/2006 | Ay |
| 7,118,082 B2 | 10/2006 | Brnjac |
| 7,213,877 B2 | 5/2007 | Gramss |
| 2007/0069555 A1 | 3/2007 | Jones |

* cited by examiner

RETRACTABLE ACCESSORY HOOK FOR A VEHICLE

FIELD

The present invention relates generally to devices for securing articles in a vehicle during transport, and in particular to a hook that is retractable when not in use to protect passengers and objects from inadvertent snagging or abrasions from the hook.

BACKGROUND

Accessory hooks for securing plastic grocery and merchandise sacks, garment hangers and the like in motor vehicles are known in the art. Such accessory hooks are used primarily to protect both the articles in the sack or on the hanger from being damaged, as well as to protect passengers in the vehicle from these same articles during transport in the event of sudden deceleration or sharp cornering.

Accessory hooks for securing plastic grocery or merchandise sacks are often located in the passenger compartment or the cargo area of a vehicle. Similarly, accessory hooks for securing a garment hanger are usually located in a headliner of the vehicle or on an adjacent garnish molding. While accessory hooks for these applications are known in the prior art, they suffer from several drawbacks. For example, suspending articles from hooks located in the headliner or garnish molding can obscure the driver's and passengers' view through windows of the passenger doors. In addition, articles so suspended can make vehicle ingress and egress cumbersome for the passengers.

Another shortcoming of current accessory hooks is that they tend to project into the vehicle interior even when not in use, increasing the potential for inadvertent snagging or abrasions to passengers. One solution to this problem is to configure the hook so that it can be retracted when not in use. Example retractable hooks found in the art include U.S. Pat. Nos. 6,959,954 to Brandt et al., 5,769,294 to Heinz et al. and 4,720,028 to Takemura et al. While these devices perform their intended purpose, they typically utilize an opposing surface of the hook as a closeout panel when the hook is in a stowed position. Such hooks are subject to unintentional movement to at least a partially extended position due to vibration and shock imparted to the hook by the vehicle when the vehicle is in motion. Others have attempted to overcome these drawbacks by incorporating latches and biasing devices into the accessory hook assembly, such as U.S. Pat. Nos. 6,663,067 to Gordon and 6,095,469 to Von Alman. However, such accessory hooks are relatively complex and expensive to produce and are subject to failure with repeated use. There is a need for a reliable accessory hook that requires relatively few components, is inexpensive to produce and is retained in a stowed position when not in use.

SUMMARY

A retractable accessory hook that is stowable within a housing and is at least partially hidden by a cover when stowed is disclosed according to an embodiment of the present invention. The accessory hook can be deployed for use by opening the cover, moving the hook from its stowed position within the housing to a generally horizontal deployed position at least partially extending from the housing, then closing the cover to retain the hook in place in a deployed position. When the accessory hook is no longer needed the cover may be lifted and the hook moved into the stowed position. The cover is then re-closed, again at least partially hiding the accessory hook from view. In one embodiment of the present invention the retractable accessory hook is mounted in the rear side of the seatback of a vehicle seat. In this embodiment items secured by the hook are located forward of the rear passengers, proximate the rear side of the seat.

An object of the present invention is a retractable accessory hook assembly for a vehicle. The assembly includes a housing having a cavity with an opening. A hook is pivotably coupled to the housing and is movable between a stowed position substantially within the cavity and a deployed position at least partially extending from the opening of the cavity. A cover is also pivotably coupled to the housing and is configured to selectably close off at least a portion of the opening of the cavity. The cover is movable from a closed position proximate the housing to an open position away from the housing while the hook is being moved to a stowed or deployed position. The cover is also movable from the open position to the closed position to retain the hook in either of the stowed and deployed positions.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

In the discussion that follows, like reference numerals are used to identify like elements in the various views.

Figure 1:
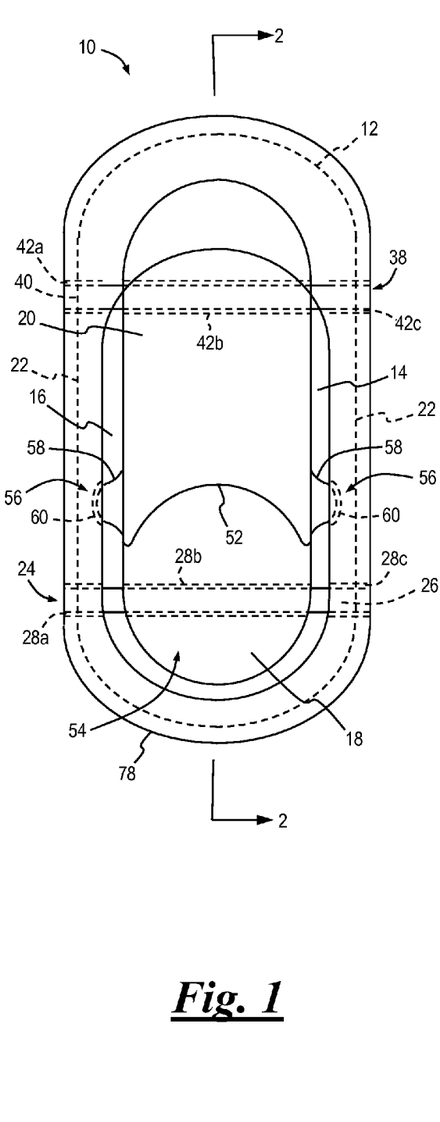
FIG. 1 is a front plan view of a retractable accessory hook assembly according to an embodiment of the present invention.
Figure 2:
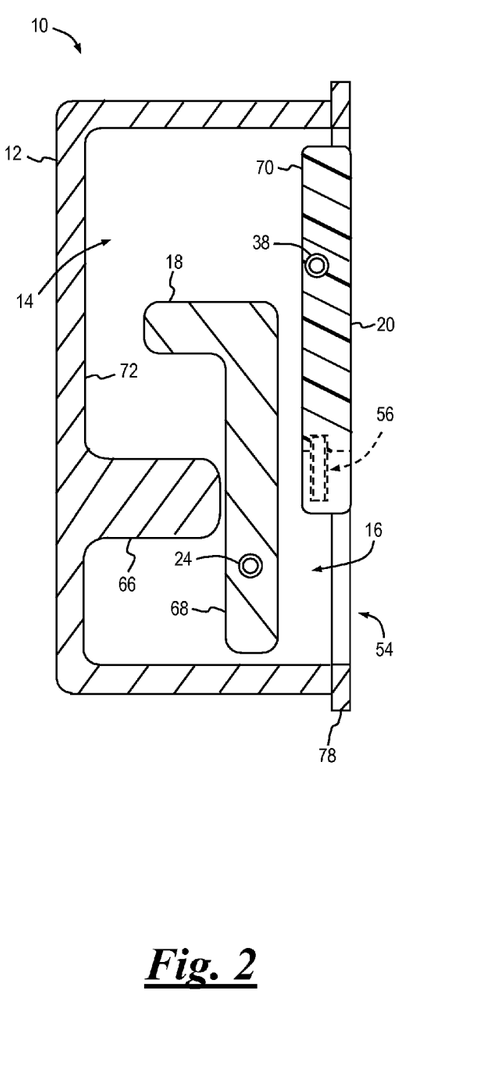
FIG. 2 is a view in section of the retractable accessory hook assembly of FIG. 1 showing the general arrangement of the assembly, with a hook of the assembly in a stowed position and a cover of the assembly in a closed position.

The general arrangement of a retractable accessory hook 10 is shown in FIGS. 1 and 2 according to an embodiment of the present invention. Accessory hook 10 comprises a housing 12 having a cavity 14 formed therein, the cavity including an opening 16. A hook 18 is disposed within the cavity and is pivotably coupled to housing 12. A cover 20 is likewise pivotably coupled to housing 12 and at least partially closes off opening 16.

Figure 3:
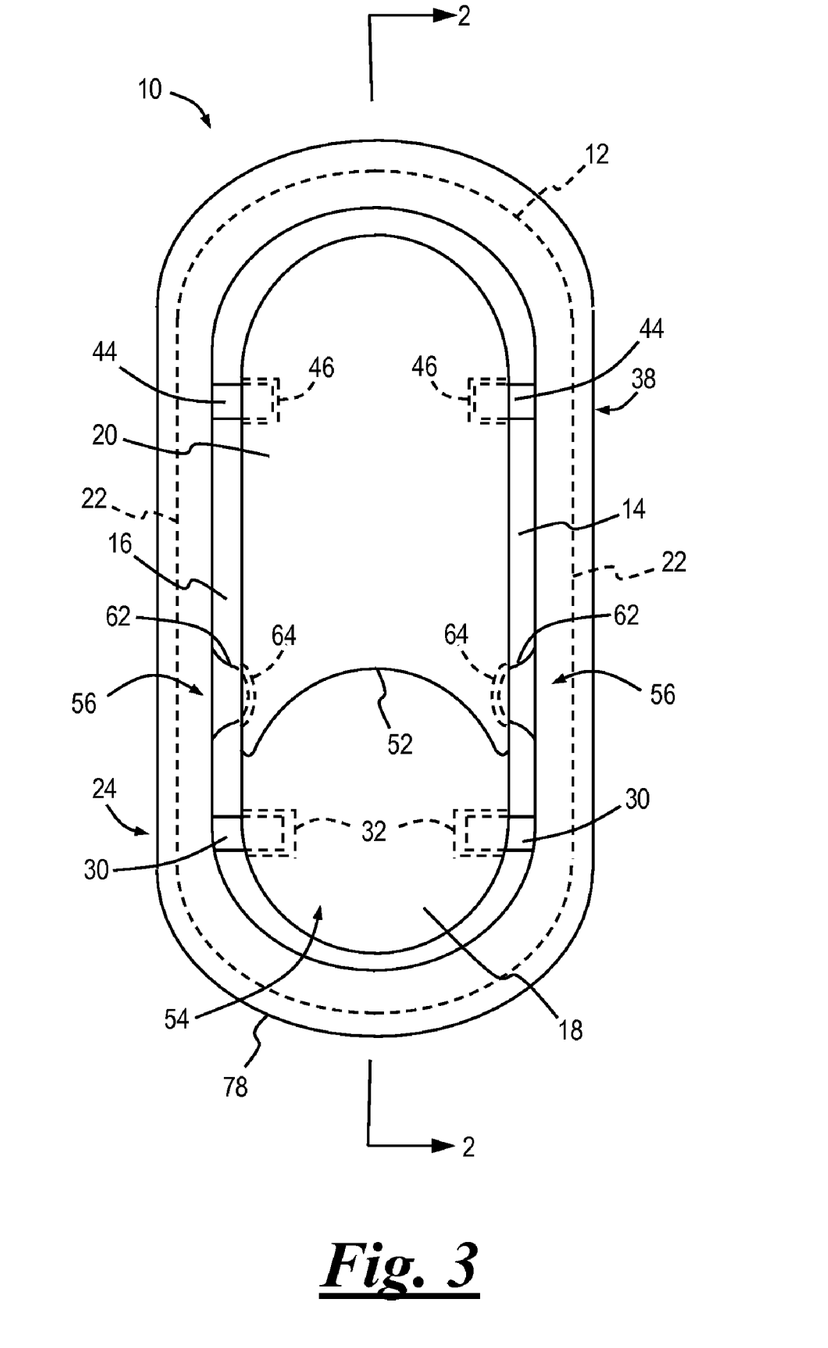
FIG. 3 is a front plan view of a retractable accessory hook assembly according to another embodiment of the present invention.
Figure 4:
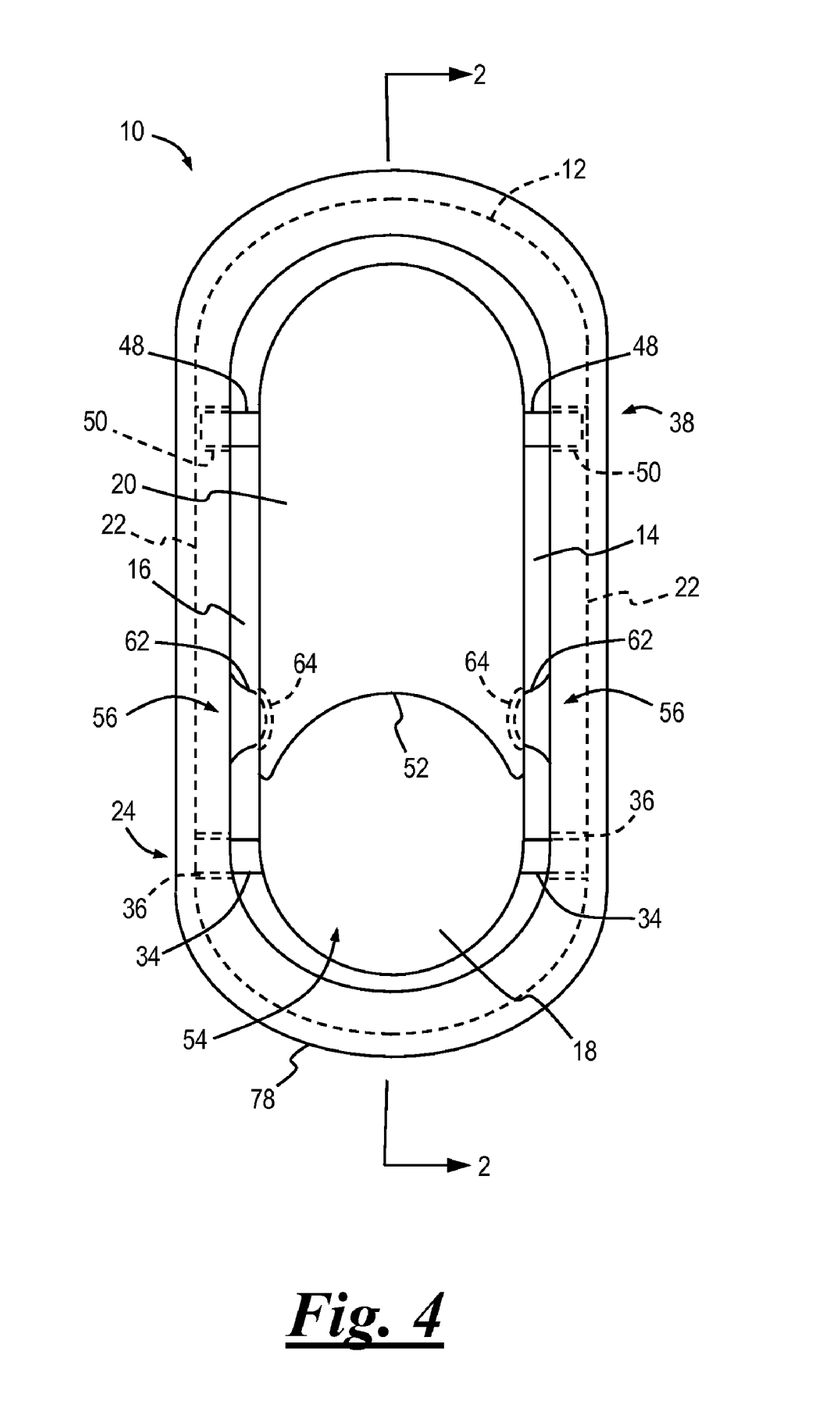
FIG. 4 is a front plan view of a retractable accessory hook assembly according to yet another embodiment of the present invention.

Hook 18 is generally L-shaped and is pivotably coupled to a pair of side walls 22 of housing 12 in any conventional manner, such as a hook pivot 24 comprising a pivot pin 26 extending through aligned openings 28a, 28b, 28c in the side walls and the hook as shown in FIG. 1. Alternatively, hook pivot 24 may comprise a pair of spaced-apart hook pivot pins 30 formed in side walls 22, onto which a pair of corresponding apertures 32 formed in hook 18 are snapped, as shown in FIG. 3. In yet another embodiment hook pivot 24 may comprise opposing hook pivot pins 34 formed in hook 18 and snapped into corresponding apertures 36 formed in side walls 22, as shown in FIG. 4.

With reference again to FIGS. 1 and 2, cover 20 is generally planar and is pivotably coupled to side walls 22 of housing 12 in any conventional manner, such as a cover pivot 38 comprising a pivot pin 40 extending through a set of aligned openings 42a, 42b, 42c in the side walls and the cover. Alternatively, cover pivot 38 may comprise a pair of cover pivot pins 44 formed in side walls 22, onto which a pair of corresponding apertures 46 formed in cover 20 are snapped, as shown in FIG. 3. In yet another embodiment, cover pivot 38 may comprise opposing cover pivot pins 48 formed in cover 20 and snapped into corresponding apertures 50 formed in side walls 22, as shown in FIG. 4. Cover 20 may further include a curved portion 52 which, in cooperation with opening 16 and housing 12, forms a finger hold 54 as shown in FIGS. 1 through 4.

With continuing reference to FIGS. 1 and 2, retractable accessory hook 10 may include one or more snaps 56 comprising, for example, one or more protrusions 58 extending from cover 20 to engage corresponding recesses 60 formed in side walls 22, the protrusions and recesses cooperating to releasably retain the cover proximate the housing. Alternatively, snaps 56 may comprise one or more protrusions 62 extending from side walls 22 to engage corresponding recesses 64 formed in cover 20, as shown in FIGS. 3 and 4.

As shown in FIG. 2, housing 12 may further include a stop 66 that limits the extent to which hook 18 may be pivoted outwardly when deployed. Accordingly, when hook 18 is pivoted outwardly from housing 12 to a deployed position a lower portion 68 of the hook contacts stop 66, thereby limiting the downward travel of the hook.

Figure 5:
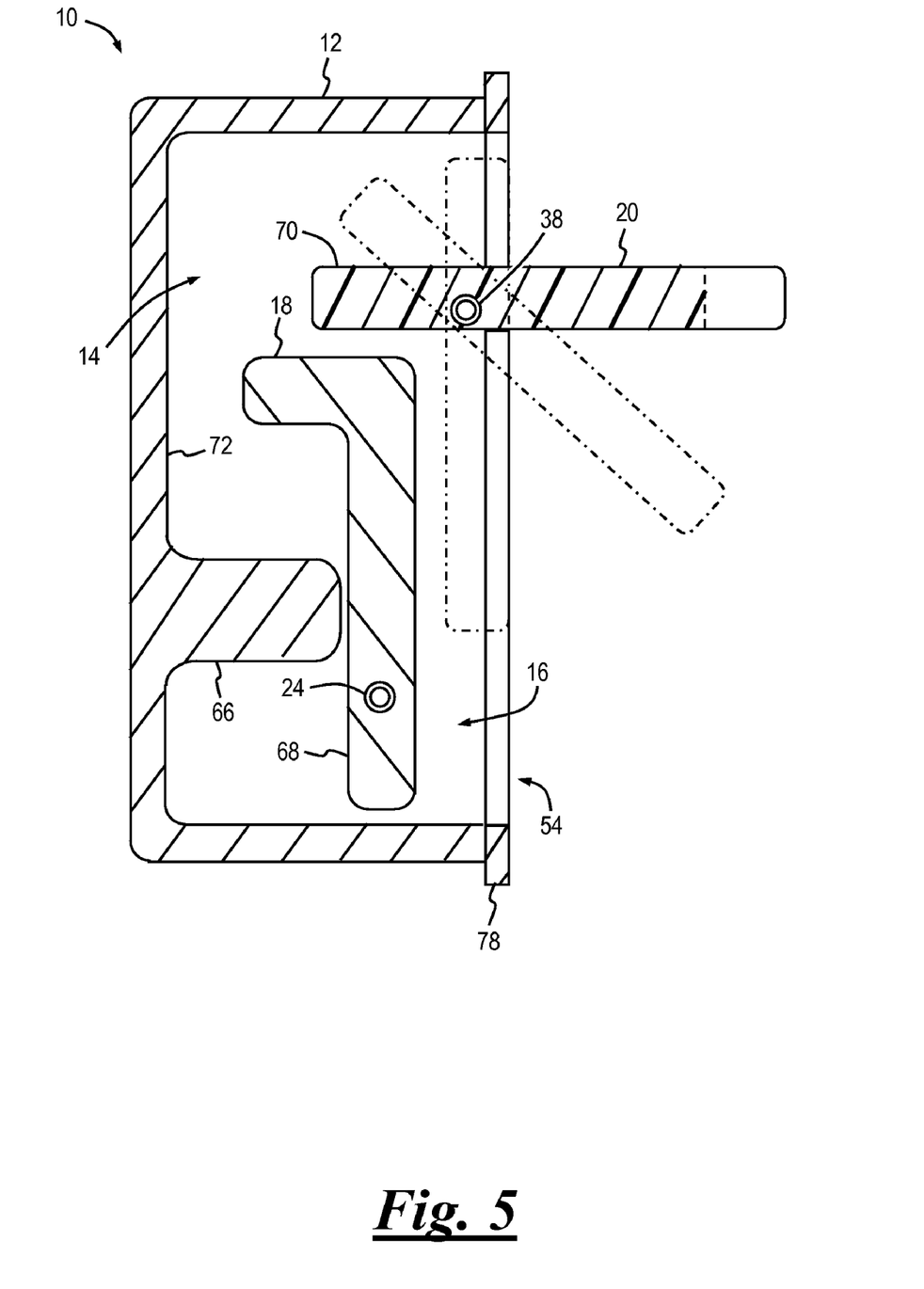
FIG. 5 shows the view in section of FIG. 2 with the cover being moved from the closed position to an open position with the hook in a stowed position.
Figure 6:
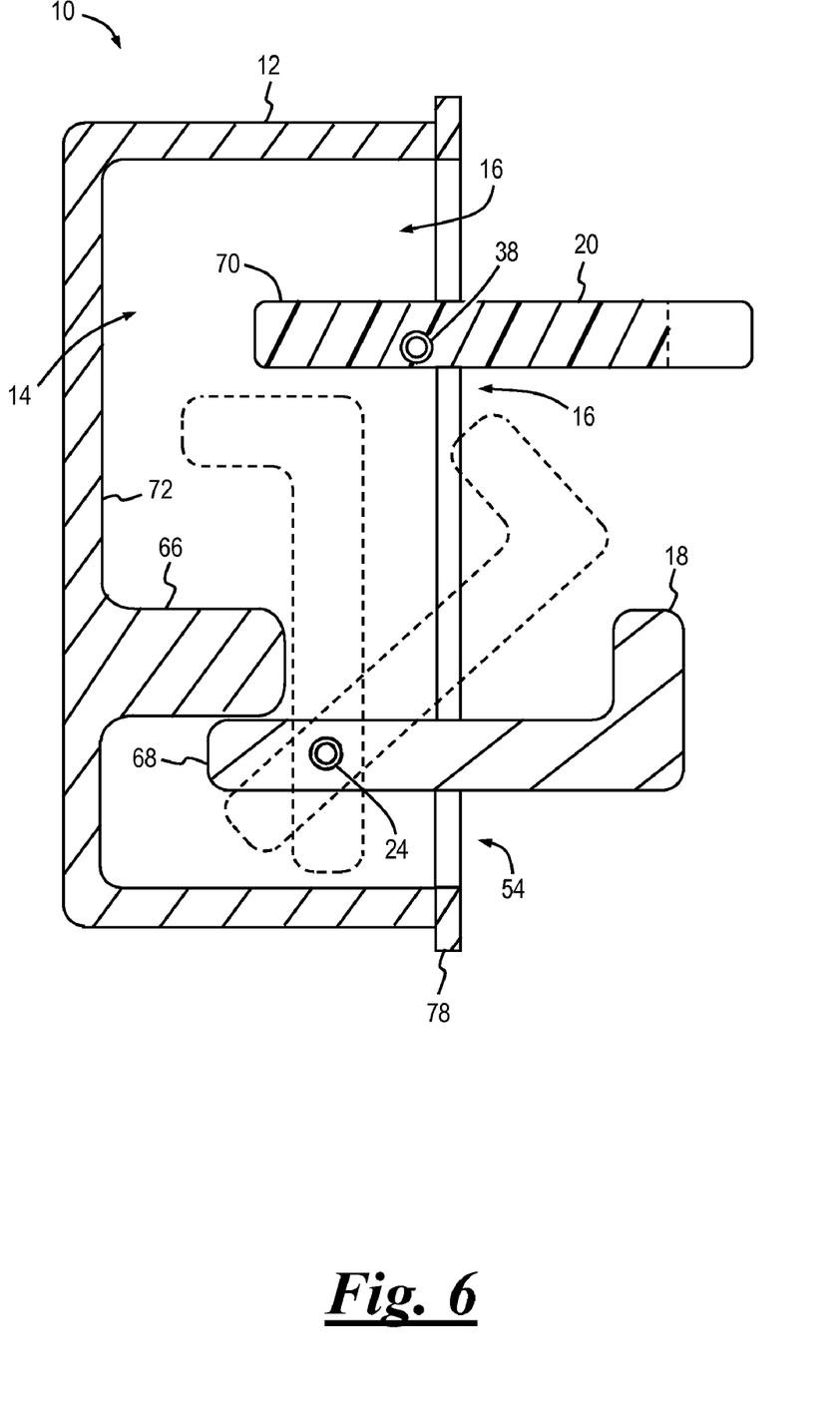
FIG. 6 shows the view in section of FIG. 2 with the cover in the open position and the hook being moved from the stowed position to a deployed position.
Figure 7:
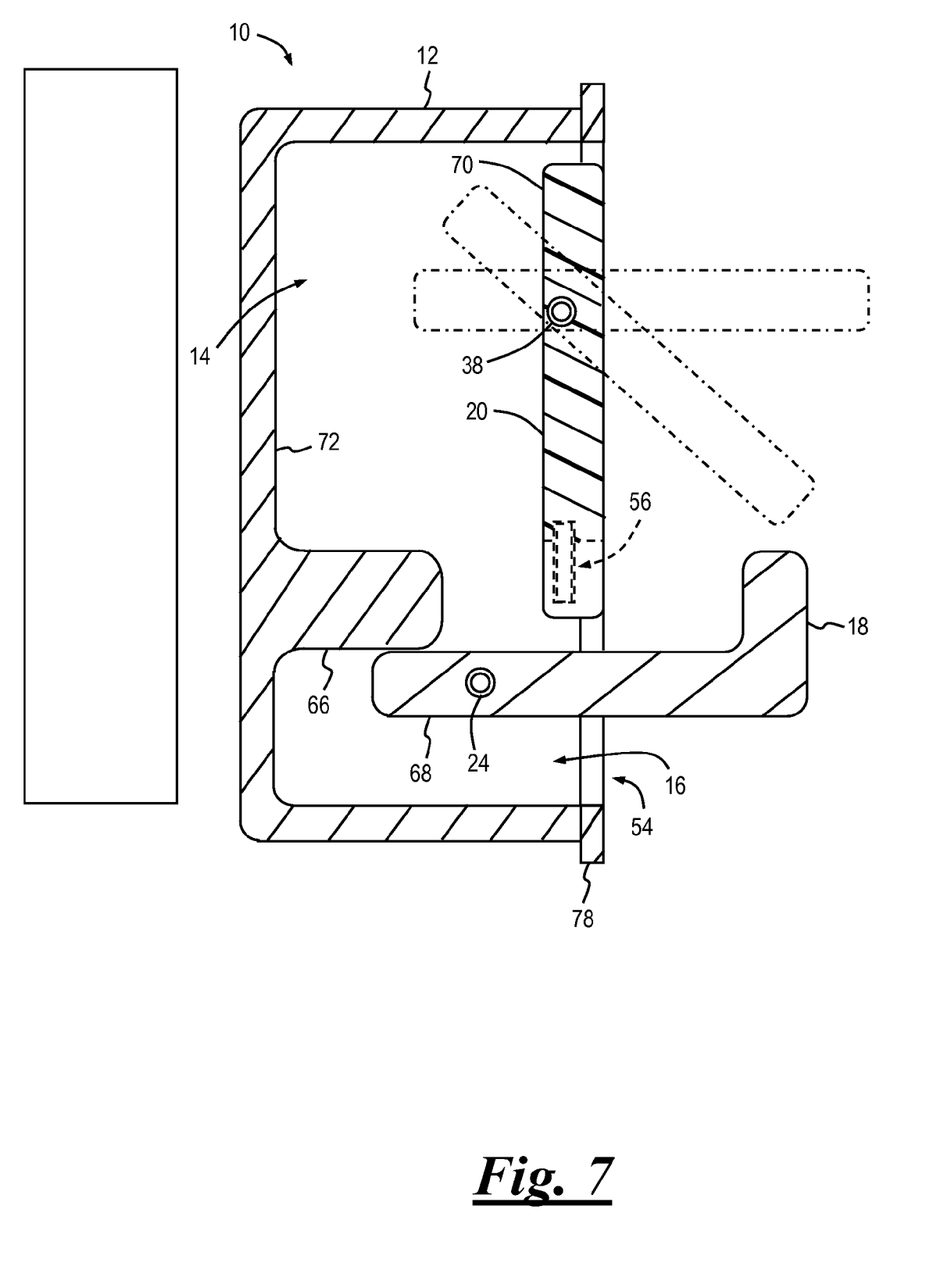
FIG. 7 shows the view in section of FIG. 2 with the cover being moved from the open position to the closed position and the hook in the deployed position.
Figure 8:
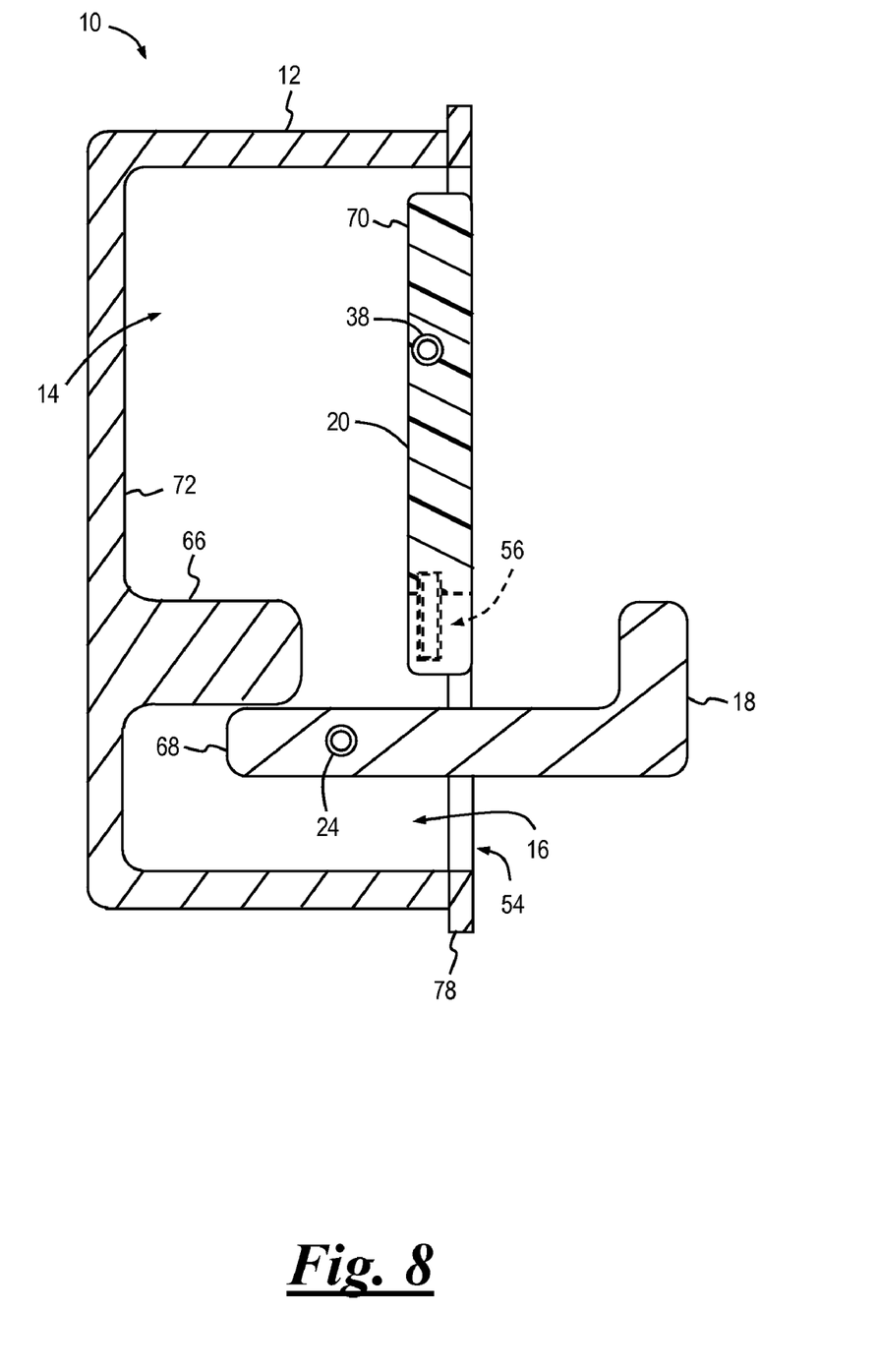
FIG. 8 shows the view in section of FIG. 2 with the cover in the closed position and the hook in the deployed position.

With reference now to FIGS. 1 through 11 together, in operation hook 18 may be moved from a stowed position generally within cavity 14 to a generally horizontal deployed position extending at least partially from housing 12 by inserting a finger into finger hold 54 and urging cover 20 away from housing 12 with sufficient force to overcome the retention force of snaps 56 and then pivoting the cover outwardly and upwardly, away from the housing to an open position (FIG. 5). Hook 18 may then be grasped, such as with a finger, and pivoted outwardly and downwardly away from housing 12 such that the hook at least partially extends from the housing (FIG. 6). Alternatively, lower portion 68 of hook 18 may be pushed, such as with a finger tip, causing the hook to pivot outwardly and downwardly away from housing 12 such that the hook at least partially extends therefrom. Downward travel of hook 18 may be limited by stop 66 in cooperation with lower portion 68 of the hook in the manner previously detailed. After hook 18 is extended cover 20 may be pivoted downwardly and inwardly to a closed position proximate housing 12 (FIG. 7). Cover 20 is pressed with sufficient force to engage snaps 56, thereby retaining the cover in the closed position with hook 18 extending through finger hold 54 and ready for use in hanging articles therefrom (FIG. 8).

Figure 9:
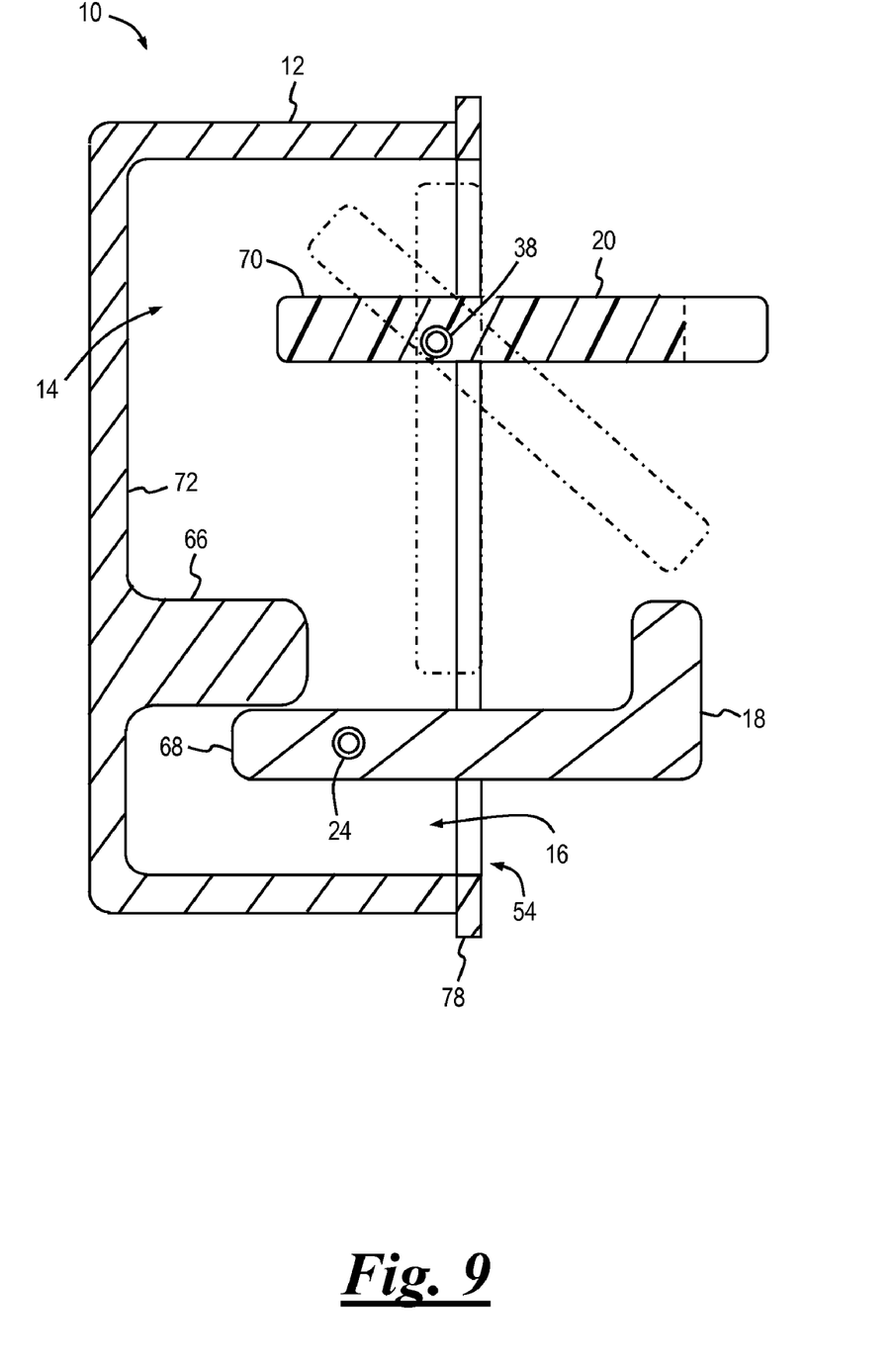
FIG. 9 shows the view in section of FIG. 2 with the cover being moved from the closed position to the open position and the hook in a deployed position.
Figure 10:
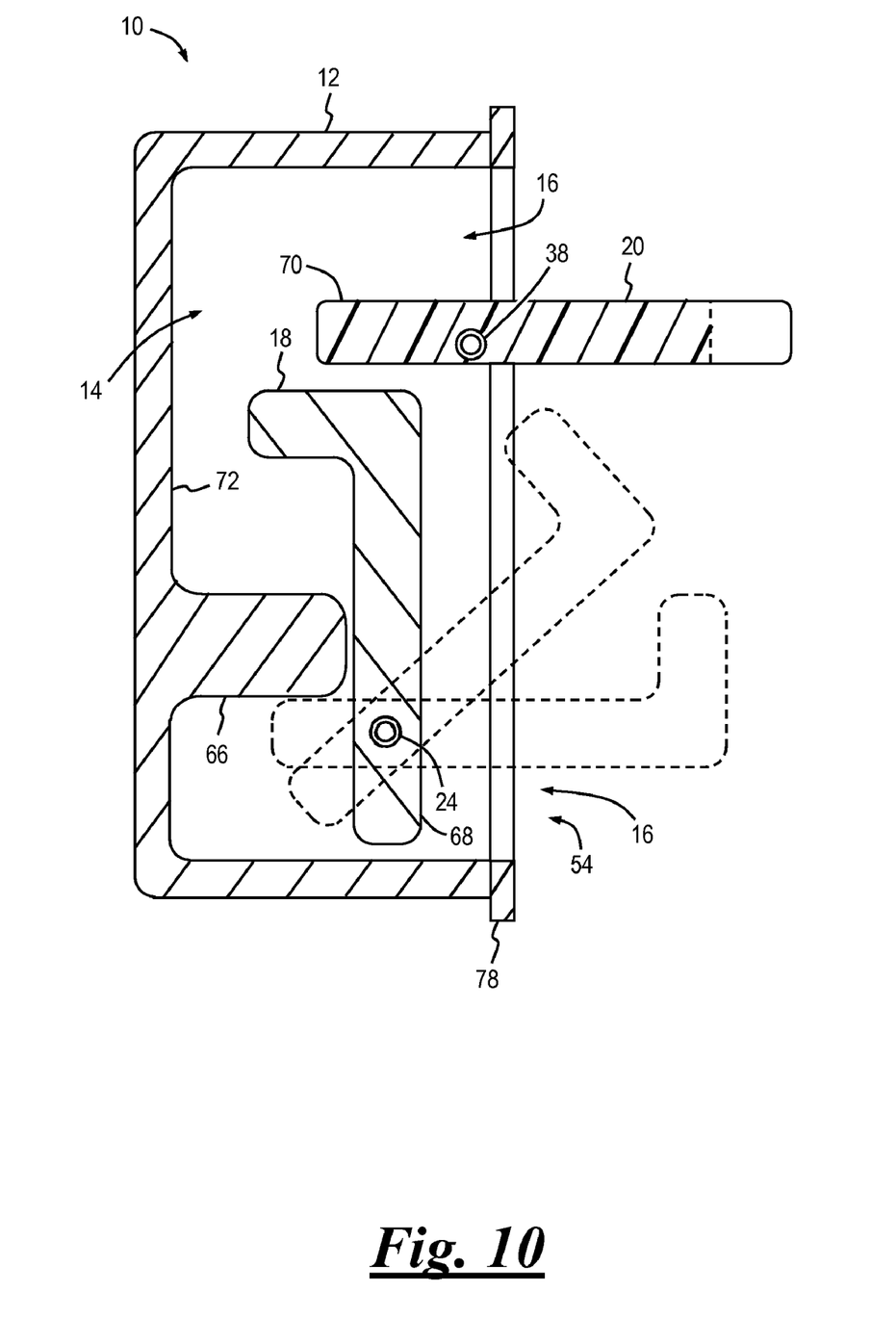
FIG. 10 shows the view in section of FIG. 2 with the cover in the open position and the hook being moved from the deployed position to the stowed position.
Figure 11:
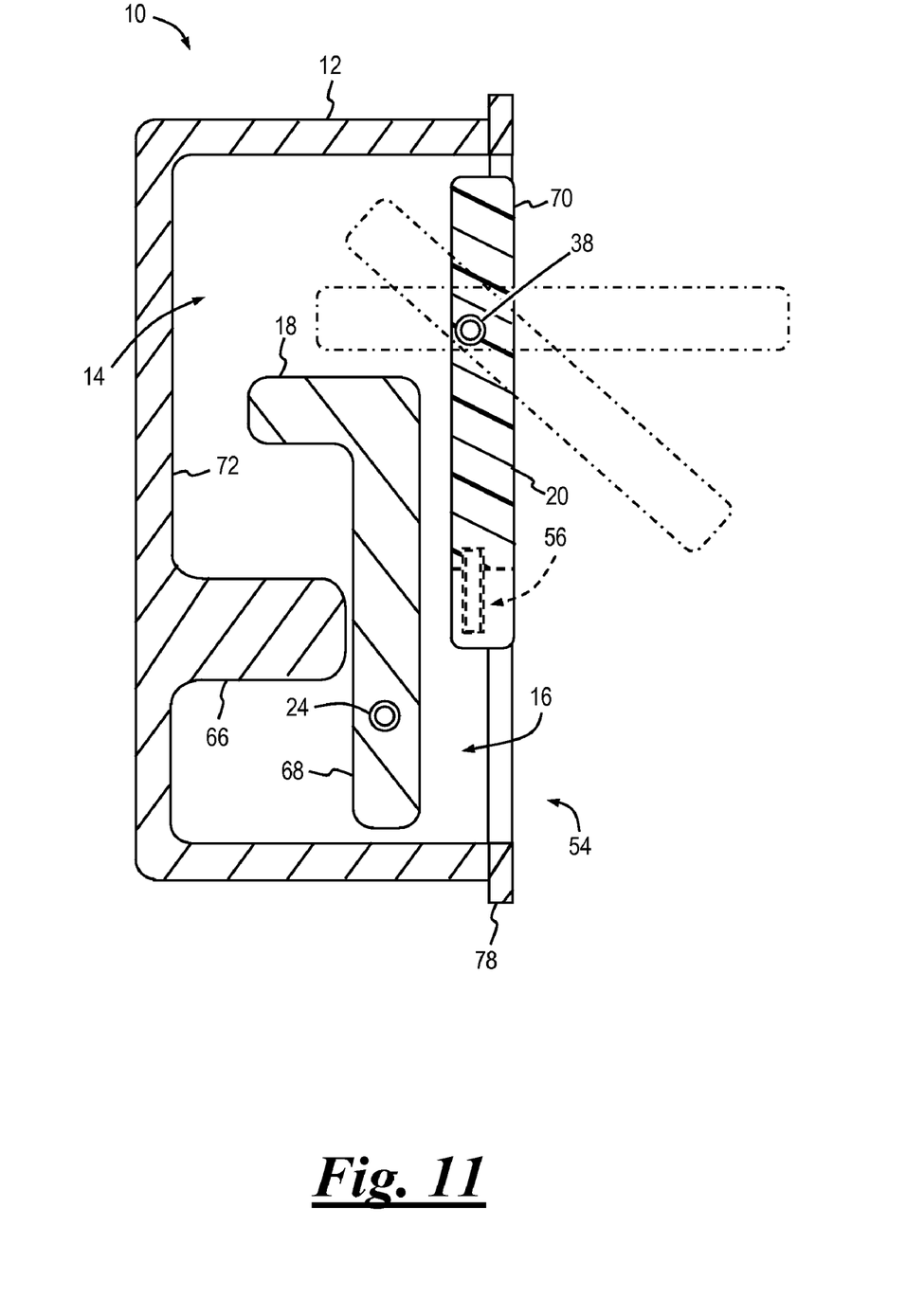
FIG. 11 shows the view in section of the retractable hook assembly of FIG. 2 with the cover being moved from the open position to the closed position and the hook in the stowed position.

When not in use, hook 18 may be moved from a deployed position to a stowed position by inserting a finger at least partially into finger hold 54 and urging cover 20 away from housing 12 with sufficient force to overcome the retention force of snaps 56 and then pivoting the cover outwardly and upwardly, away from the housing to an open position (FIG. 9). Alternatively, an upper portion 70 of cover 20 may be pushed, such as with a finger, causing the cover to pivot outwardly and upwardly away from housing 12 to an open position. Hook 18 may then be pivoted upwardly and toward housing 12 such that the hook is stowed generally within cavity 14 of the housing (FIG. 10). Inward travel of hook 18 may be limited by a rear wall 72 of housing 12, or by stop 66. After hook 18 is stowed cover 20 may be pivoted downwardly and inwardly to a closed position proximate housing 12 (FIG. 11). Cover 20 is pressed with sufficient force to engage snaps 56, thereby retaining the cover in a closed position proximate housing 12. FIG. 2 illustrates hook 18 stowed generally within cavity 14 with cover 20 in a closed position.

The components of retractable hook assembly 10, including housing 12, hook 18 and cover 20 may be made from any material suitable for use with the retractable accessory hook assembly and the expected environment including, without limitation, metal, plastic and composites. In addition, the components may be formed in any conventional manner including, but not limited to, casting, machining, forming, molding, stamping and spinning. Furthermore, the components may be finished in any conventional manner, such as painting, coating or plating, or may be left unfinished.

Figure 12:
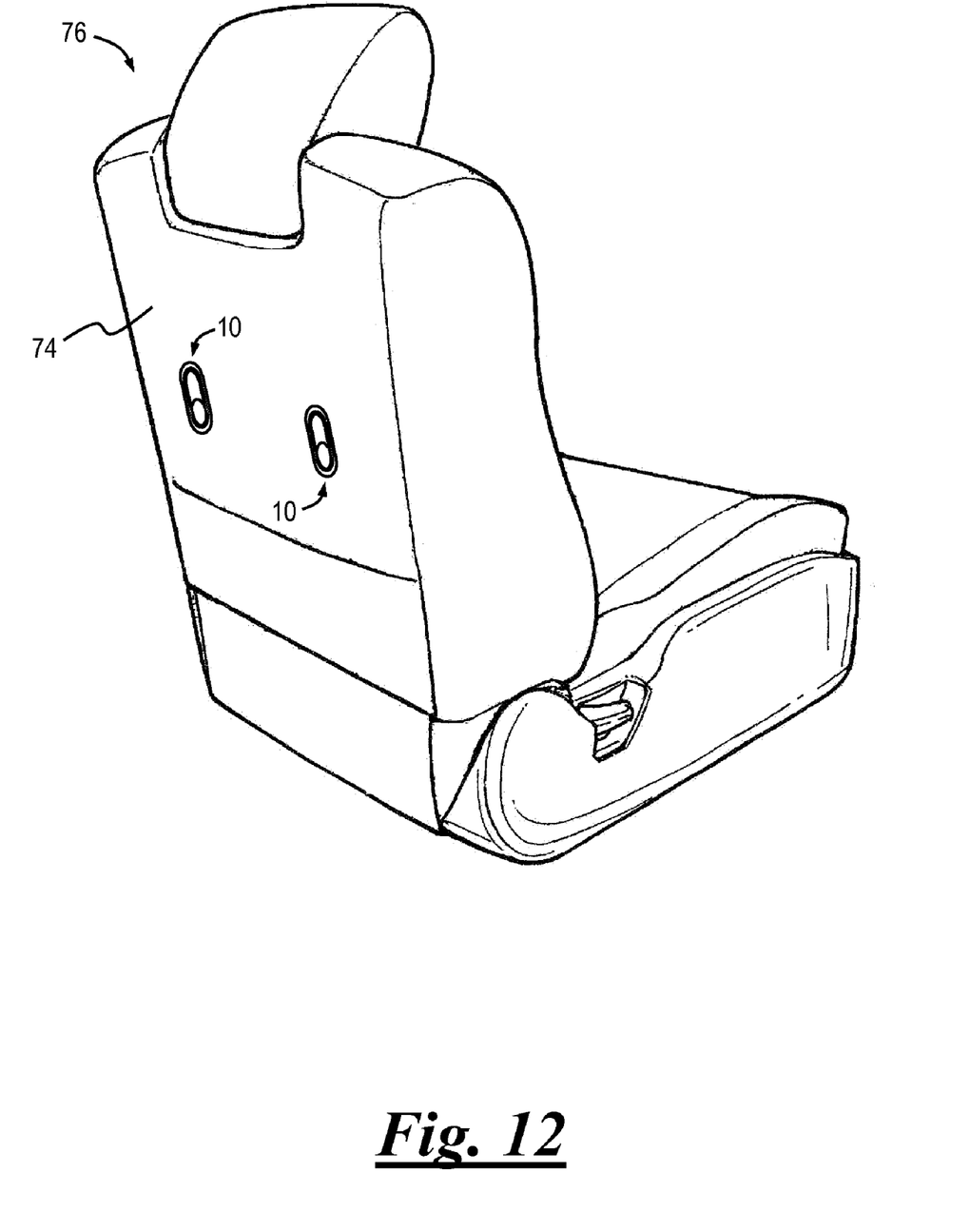
FIG. 12 shows a pair of retractable accessory hook assemblies mounted to a seatback of a vehicle seat according to an embodiment of the present invention.

FIG. 12 shows a pair of retractable accessory hook assemblies 10 mounted to a rear surface of a seatback 74 of a vehicle seat 76. When not needed, hooks 18 of the hook assemblies 10 may be stowed in the manner described above and illustrated in FIGS. 9 through 11, out of the way of passengers seated behind vehicle seat 76. When articles such as shopping bags, coats, toys, and so on are to be carried in the vehicle one or more of retractable accessory hook assemblies 10 may be deployed in the manner described above and illustrated in FIGS. 5 through 7, the articles being secured to the extended hook(s) 18. Although shown mounted to a vehicle seatback in FIG. 12, it will be understood that retractable hook assembly 10 may be mounted in any convenient area of a vehicle including, without limitation, cargo areas, passenger spaces and the trunk.

Retractable accessory hook 10 may optionally include a trim bezel 78, as shown in FIGS. 1 and 2. Trim bezel 78 may be made integral with housing 12 or made as a separate piece and attached to the housing in any conventional manner such as, without limitation, adhesive, sonic welding, a molded snap-fit and fasteners.

While this invention has been shown and described with respect to a detailed embodiment thereof, it will be understood by those skilled in the art that changes in form and detail thereof may be made without departing from the scope of the claims of the invention.

What is claimed is:

1. A retractable accessory hook assembly for a vehicle, comprising:
    a housing having a cavity with an opening;
    a hook pivotably coupled to the housing, the hook being movable between a stowed position substantially within the cavity and a deployed position at least partially extending from the opening of the cavity; and
    a cover pivotably coupled to the housing and configured to selectably close off at least a portion of the cavity opening in a closed position and to expose at least a portion of the cavity opening in an open position, the cover including a curved portion, the curved portion and the housing cooperating to form a finger hold,
    wherein the cover is movable from the closed position to the open position while the hook is being moved to a stowed or deployed position, and wherein the cover is movable from the open position to the closed position to retain the hook in either the stowed or deployed positions.

2. The retractable accessory hook assembly of claim 1 wherein the hook extends through the finger hold when in the deployed position.

3. The retractable accessory hook assembly of claim 1 wherein the housing further comprises a stop to limit the travel of the hook.

4. The retractable accessory hook assembly of claim 3 wherein the stop limits inward travel of the hook in the stowed position.

5. The retractable accessory hook assembly of claim 3 wherein the stop limits outward travel of the hook in the deployed position.

6. The retractable accessory hook assembly of claim 1 wherein inward travel of the hook in the stowed position is limited by a rear wall of the housing.

7. The retractable accessory hook of claim 1, further comprising at least one snap to releasably retain the cover proximate the housing when in the closed position.

8. The retractable accessory hook of claim 7 wherein the snap comprises at least one protrusion extending from a side wall of the housing to releasably engage a corresponding recess formed in the cover.

9. The retractable accessory hook of claim 7 wherein the snap comprises at least one protrusion extending from the cover to releasably engage a corresponding recess formed in a side wall of the housing.

10. The retractable accessory hook of claim 1 wherein the hook is pivotably coupled to the housing with a pivot pin extending through aligned openings formed in the hook and in side walls of the housing.

11. The retractable accessory hook of claim 1 wherein the hook is pivotably coupled to the housing with a pair of spaced-apart pivot pins extending from opposing side walls of the housing to engage corresponding apertures formed in the hook.

12. The retractable accessory hook of claim 1 wherein the hook is pivotably coupled to the housing with a pair of opposing pivot pins extending from the hook to engage corresponding apertures formed in opposing side walls of the housing.

13. The retractable accessory hook of claim 1 wherein the cover is pivotably coupled to the housing with a pivot pin extending through aligned openings formed in the cover and in side walls of the housing.

14. The retractable accessory hook of claim 1 wherein the cover is pivotably coupled to the housing with a pair of spaced-apart pivot pins extending from opposing side walls of the housing to engage corresponding apertures formed in the cover.

15. The retractable accessory hook of claim 1 wherein the cover is pivotably coupled to the housing with a pair of opposing pivot pins extending from the cover to engage corresponding apertures formed in opposing side walls of the housing.

16. The retractable accessory hook of claim 1 wherein the housing further comprises a trim bezel.

17. The retractable accessory hook of claim 1 wherein the retractable hook assembly is mounted to a seatback of a vehicle seat.

18. A retractable accessory hook assembly for a vehicle, comprising:
    a housing having a cavity with an opening;
    a hook pivotably coupled to the housing, the hook being movable between a stowed position substantially within the cavity and a deployed position at least partially extending from the opening of the cavity; and
    a cover pivotably coupled to the housing and configured to selectably close off at least a portion of the cavity opening in a closed position and to expose at least a portion of the cavity opening in an open position, the cover including a curved portion that cooperates with the housing to form a finger hold,
    wherein the cover is movable from the closed position to the open position while the hook is being moved to a stowed or deployed position, and wherein the cover is movable from the open position to the closed position to retain the hook in either the stowed or deployed positions, and
    wherein the hook extends through the finger hold when in the deployed position.

19. A method for making a retractable accessory hook assembly for a vehicle, comprising the steps of:
    forming a housing having a cavity with an opening;
    pivotably coupling a hook to the housing such that the hook is movable between a stowed position substantially within the cavity and a deployed position at least partially extending from the opening of the cavity; and
    pivotably coupling a cover to the housing such that the cover is movable to selectably close off at least a portion of the cavity opening in a closed position and to expose at least a portion of the cavity opening in an open position, the cover including a curved portion, the curved portion and the housing cooperating to form a finger hold,
    wherein the cover is movable from a the closed position to the open position while the hook is being moved to a stowed or deployed position, and wherein the cover is movable from the open position to the closed position to retain the hook in either the stowed or deployed positions.

* * * * *

UNITED STATES PATENT AND TRADEMARK OFFICE
CERTIFICATE OF CORRECTION

PATENT NO. : 7,669,821 B2  Page 1 of 1
APPLICATION NO. : 11/866166
DATED : March 2, 2010
INVENTOR(S) : Amy L. Martin It is certified that error appears in the above-identified patent and that said Letters Patent is hereby corrected as shown below:

On the title page, Item (74), "Mark Duall" should be -- Gregory J. Burke --.

Column 6, in claim 19, line 55, "from a the closed position" should read -- from the closed position --.

Signed and Sealed this

Eleventh Day of May, 2010

David J. Kappos
*Director of the United States Patent and Trademark Office*